(12) United States Patent
Okamoto et al.

(10) Patent No.: US 10,330,536 B2
(45) Date of Patent: Jun. 25, 2019

(54) STRUCTURE FOR ATTACHING TEMPERATURE DETECTING MEMBER TO BUSBAR, WIRING MODULE AND METHOD FOR MANUFACTURING WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Ryouya Okamoto, Mie (JP); Osamu Nakayama, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 168 days.

(21) Appl. No.: 15/533,708

(22) PCT Filed: Dec. 10, 2015

(86) PCT No.: PCT/JP2015/084603
§ 371 (c)(1),
(2) Date: Jun. 7, 2017

(87) PCT Pub. No.: WO2016/104157
PCT Pub. Date: Jun. 30, 2016

(65) Prior Publication Data
US 2017/0328783 A1 Nov. 16, 2017

(30) Foreign Application Priority Data
Dec. 25, 2014 (JP) .................................. 2014-261906

(51) Int. Cl.
*G01K 1/00* (2006.01)
*G01K 13/00* (2006.01)
(Continued)

(52) U.S. Cl.
CPC ................. *G01K 1/14* (2013.01); *G01K 7/22* (2013.01); *H01M 2/206* (2013.01); *H01M 2/22* (2013.01);
(Continued)

(58) Field of Classification Search
USPC ........................................ 374/208, 141, 163
See application file for complete search history.

(56) References Cited

U.S. PATENT DOCUMENTS 10,062,931 B2 * 8/2018 Tyler ..................... H01M 2/202
10,090,568 B2 * 10/2018 Hatta ..................... H01M 2/204
(Continued)

FOREIGN PATENT DOCUMENTS

JP 2011-76936 4/2011
JP 201191035 5/2011
(Continued)

OTHER PUBLICATIONS

International Search Report dated Mar. 15, 2016.

*Primary Examiner* — Mirellys Jagan
(74) *Attorney, Agent, or Firm* — Gerald E. Hespos; Michael J. Porco; Matthew T. Hespos

(57) ABSTRACT

A busbar (21) is provided for electrically connecting a temperature detecting member 40 to adjacent electrode terminals (12A, 12B) of unit cells (11). The busbar (21) is overlapped with the electrode terminals (12A, 12B) of the unit cells (11). The temperature detecting member (40) includes a plate-like heat transfer plate (42) that is overlapped in an area of the busbar (21) other than an area of the busbar (21) that is to be laser-welded to the electrode
(Continued)

terminals (12A, 12B) and is attached to the busbar (21) by laser welding.

4 Claims, 6 Drawing Sheets

(51) Int. Cl.
| | |
|---|---|
| G01K 7/00 | (2006.01) |
| G01K 1/14 | (2006.01) |
| G01K 7/22 | (2006.01) |
| H01M 2/20 | (2006.01) |
| H01M 2/22 | (2006.01) |
| H01M 10/48 | (2006.01) |
| H01R 4/02 | (2006.01) |
| H01R 13/66 | (2006.01) |

(52) U.S. Cl.
CPC .......... *H01M 10/486* (2013.01); *H01R 4/027* (2013.01); *H01M 2220/20* (2013.01); *H01R 13/6683* (2013.01); *H01R 2201/26* (2013.01)

(56) References Cited

U.S. PATENT DOCUMENTS

| | | | |
|---|---|---|---|
| 2006/0218401 A1* | 9/2006 | Jun | ........................ H04L 63/08 713/170 |
| 2011/0076521 A1 | 3/2011 | Shimizu et al. | |
| 2011/0097620 A1 | 4/2011 | Kim | |
| 2012/0019061 A1 | 1/2012 | Nishihara et al. | |
| 2013/0309537 A1 | 11/2013 | Zhao | |
| 2015/0064524 A1* | 3/2015 | Noh | ...................... H01M 10/48 429/90 |
| 2015/0171488 A1* | 6/2015 | Hatta | .................... H01M 2/204 374/152 |
| 2015/0194709 A1* | 7/2015 | Ju | ........................ H01M 10/647 429/93 |
| 2016/0028194 A1 | 1/2016 | Nakayama et al. | |
| 2016/0133908 A1* | 5/2016 | Zhao | .................... H01M 2/206 429/90 |
| 2016/0380319 A1* | 12/2016 | Rhein | ................. H01M 2/1077 429/90 |
| 2018/0026251 A1* | 1/2018 | Hinterberger | ....... B60L 11/1851 429/92 |
| 2018/0309113 A1* | 10/2018 | Nakayama | ............. H01G 11/18 |
| 2018/0328996 A1* | 11/2018 | Kimura | ................. H01R 11/287 |
| 2018/0358601 A1* | 12/2018 | Yanagihara | ......... H01M 2/1077 |

FOREIGN PATENT DOCUMENTS

| | | |
|---|---|---|
| JP | 2013-137905 | 7/2013 |
| JP | 2014-72084 | 4/2014 |
| JP | 2014-191953 | 10/2014 |
| JP | 5621765 | 10/2014 |
| JP | 2014-238938 | 12/2014 |
| JP | 2015-520934 | 7/2015 |
| WO | 2010/113455 | 10/2010 |
| WO | 2013/176913 | 11/2013 |

* cited by examiner

STRUCTURE FOR ATTACHING TEMPERATURE DETECTING MEMBER TO BUSBAR, WIRING MODULE AND METHOD FOR MANUFACTURING WIRING MODULE

BACKGROUND

1. Field of the Invention

This specification relates to a structure for attaching a temperature detecting member to a busbar, a wiring module and a method for manufacturing a wiring module.

2. Description of the Related Art

A power storage module for electric and hybrid vehicles has power storage elements connected side by side to increase an output. The power storage elements are connected in series or parallel by using connecting members, such as busbars, to connect adjacent electrode terminals.

The life of a power storage module may be reduced if the power storage module is used in a high-temperature state. A power storage module formed by connecting lithium ion cells may become excessively hot during charging. Accordingly, a temperature sensor is attached to the power storage module for detecting a temperature of the power storage element.

A known temperature sensor includes a detector in the form of a flat plate overlapped with a busbar and a voltage detection terminal is overlapped with the busbar. The detector is formed with an insertion hole, and an electrode post of the electrode terminal or a bolt to be fastened to a hole of the electrode terminal is inserted through this insertion hole. The electrode post or the bolt fastens the busbar and the voltage detection terminal together and connects the busbar and the voltage detection terminal to the electrode terminal. Thus, the temperature sensor is attached thermally to the power storage element.

Laser welding has been proposed to connect a busbar and an electrode terminal instead of fastening a bolt and a nut. However, this connection method requires a fastening member exclusively to fix the temperature sensor to the busbar and the number of components increases.

The technique disclosed in this specification was completed based on the above situation and aims to provide a structure with a small number of components for attaching a temperature detecting member to a busbar, a wiring module and a method for manufacturing a wiring module.

SUMMARY

This specification is directed to a structure for attaching a temperature detecting member to a busbar that electrically connects adjacent electrode terminals of power storage elements. The busbar is overlapped with and laser welded to the electrode terminals of the power storage elements having positive and negative electrode terminals. The temperature detecting member includes a plate-like attachment portion. The attachment portion is overlapped in an area of the busbar other than an area to be laser-welded to the electrode terminals and is attached to the busbar by laser welding.

This specification also is directed to a method for manufacturing a wiring module to be attached to power storage elements. The method includes overlapping a busbar with electrode terminals of power storage elements having positive and negative electrode terminals and laser-welding the busbar to adjacent electrode terminals of the power storage elements. The method then includes overlapping a plate-like attachment portion of a temperature detecting member in an area of the busbar other than an area laser-welded to the electrode terminals and laser-welding the attachment portion to the busbar.

According to the above-described configurations, the temperature detecting member can be attached to the busbar by overlapping the attachment portion of the temperature detecting member with the busbar and applying laser welding. Thus, it is not necessary to provide a fastening member for fixing the temperature detecting member to the busbar and the number of components can be reduced.

Further, the busbar and the attachment portion can be laser-welded, utilizing a laser welding facility when laser-welding the busbar and the electrode terminals. In such a case, a connecting operation can be simplified.

The busbar may include a body to be overlapped with the electrode terminals and a busbar-side attachment portion extending from the body. The attachment portion of the temperature detecting member may be overlapped with the busbar-side attachment portion.

This specification also is directed to a wiring module with a busbar and a temperature detecting member having the above-described attaching structure and an insulating protector for holding the busbar and the temperature detecting member therein.

According to the disclosure in this specification, it is possible to reduce the number of components in a structure for attaching a temperature detecting member to a busbar, a wiring module and a method for manufacturing a wiring module.

DETAILED DESCRIPTION

One embodiment of a structure for attaching a temperature detecting member to a battery module M is described with reference to FIGS. 1 to 5.

The battery module M according to this embodiment is installed in a vehicle (not shown) such as an electric or hybrid vehicle and is used as a power supply for driving the vehicle. The battery module M includes a unit cell group 10 formed by arranging a plurality of unit cells 11 (an example of power storage elements), and a wiring module 20 attached to the unit cell group 10 (see FIGS. 1 and 2).

Figure 1:
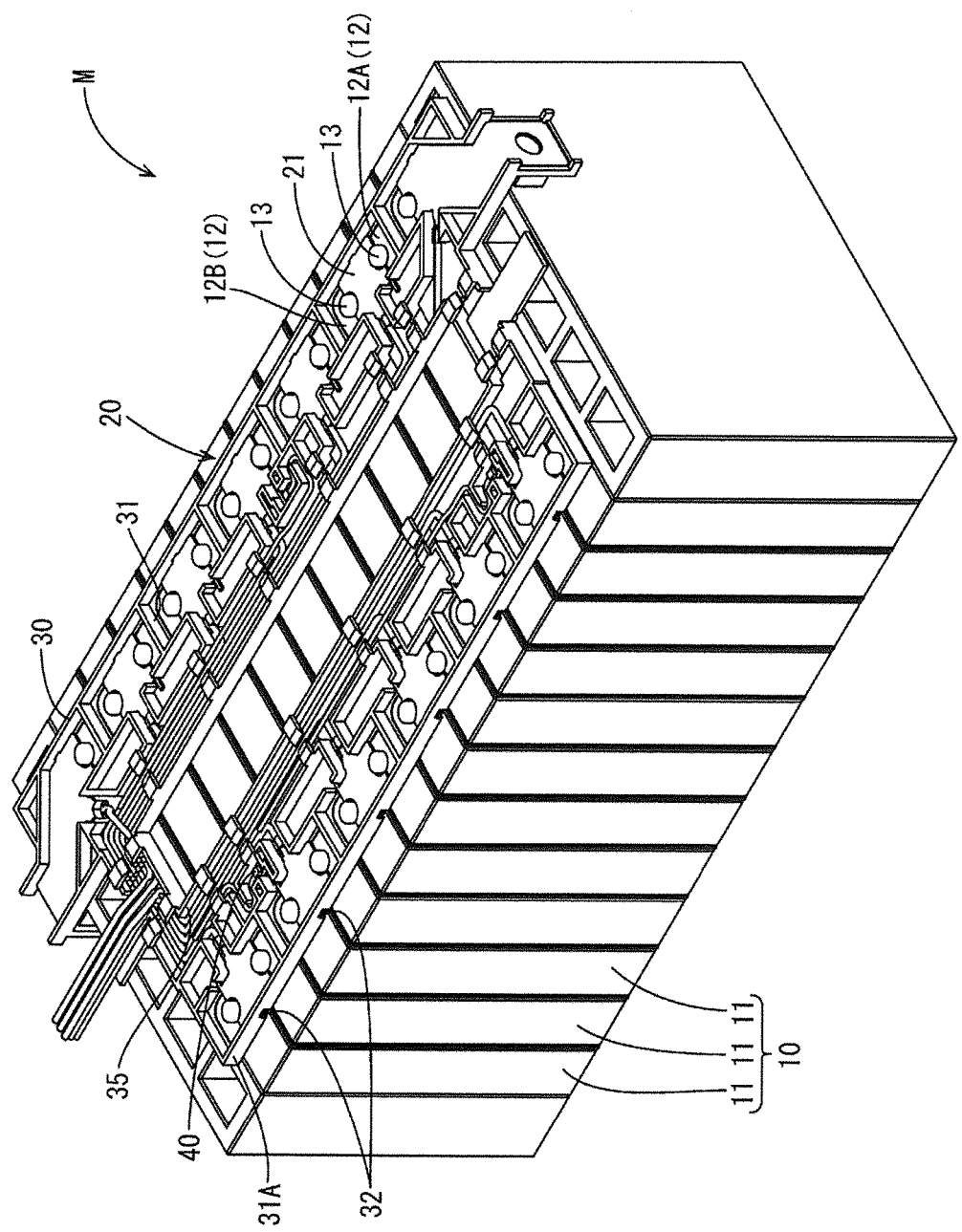
FIG. 1 is a perspective view of a battery module of one embodiment.

In the following description, upper and lower sides in FIG. 1 are referred to as upper and lower sides. Further, for a plurality of identical members, one member is denoted by a reference sign and the other members are not denoted in some cases.

(Unit Cell Group 10)

The battery module M of this embodiment includes the unit cell group 10 formed by arranging a plurality of unit cells 11 (see FIG. 1). The unit cell 11 has a flat and substantially rectangular parallelepiped shape and has an unillustrated power generating element accommodated inside. Positive and negative electrode terminals 12A, 12B are formed at positions near both ends in a longitudinal direction on the upper surface of the unit cell 11. The positive electrode terminal 12A and the negative electrode terminal 12B are shaped and sized identically. A cylindrical positioning projection 13 projects up in a central part of each electrode terminal 12A, 12B. Th unit cells 11 are arranged such that adjacent electrode terminals 12 have different polarities, thereby configuring the unit cell group 10. Adjacent unit cells 11 are electrically connected by a busbar 21 to be described later.

(Wiring Module 20)

The wiring module 20 includes busbars 21 made of metal and to be connected to the positive electrode terminals 12A and the negative electrode terminals 12B of adjacent unit cells 11. The wiring module 20 also includes temperature detecting members 40 for detecting a temperature of the busbar 21 and an insulating protector 30 made of an insulating material to hold the busbars 21 and the temperature detecting members 40.

(Busbar 21)

Figure 4:
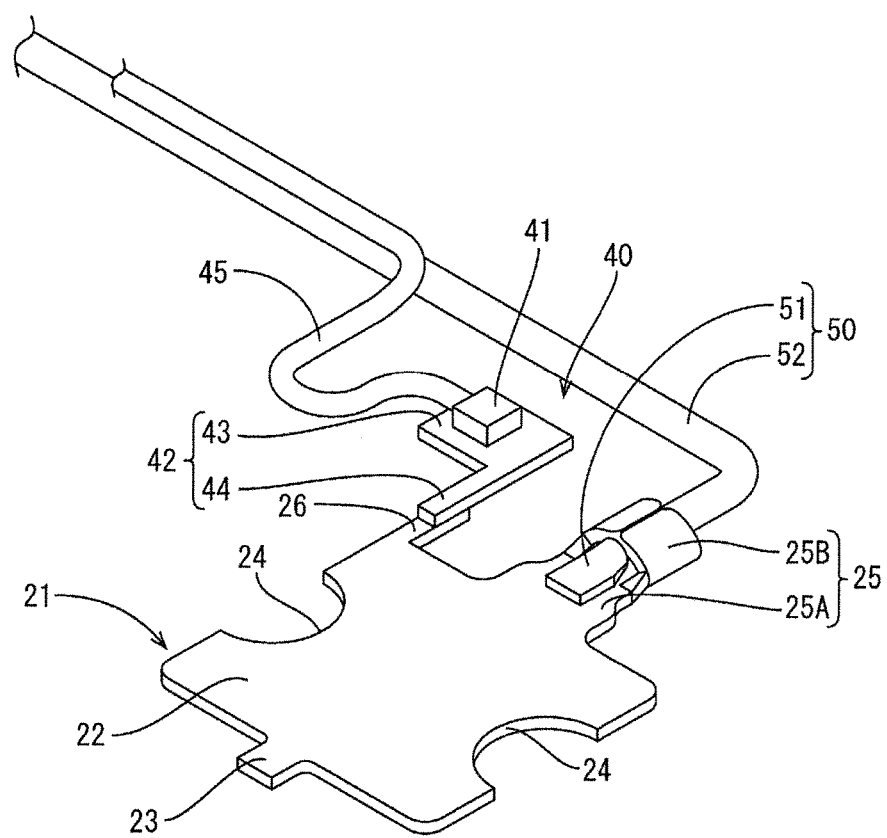
FIG. 4 is a perspective view showing a state where a temperature detecting member is attached to a busbar.
Figure 5:
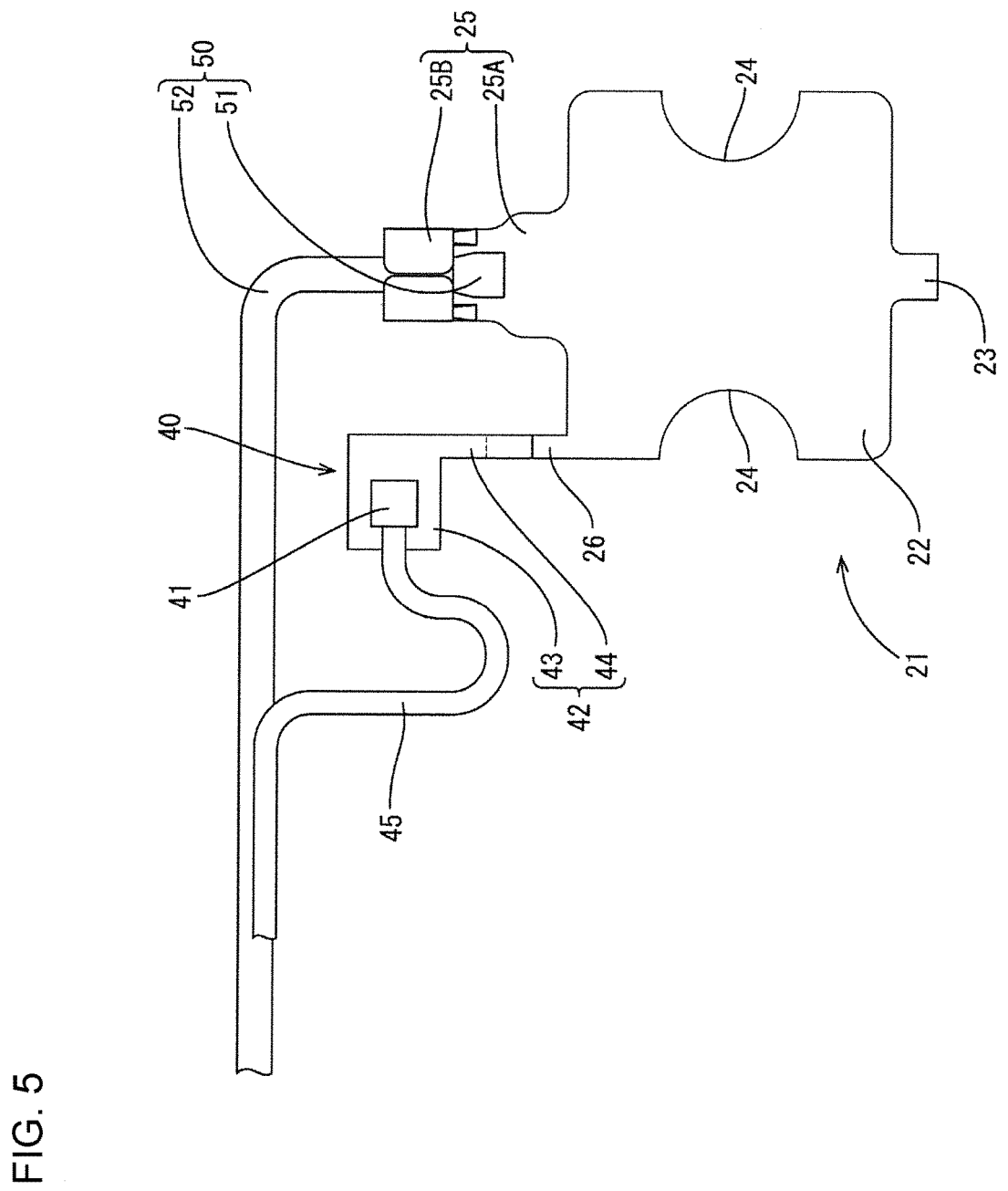
FIG. 5 is a plan view showing the state where the temperature detecting member is attached to the busbar.

As shown in FIGS. 4 and 5, the busbar 21 includes a body 22 and a connecting portion 25. The body 22 of the busbar 21 is a flat substantially square plate that is to be overlapped with parts of adjacent electrode terminals 12. The connecting portion 25 of the busbar 21 is to be connected to a wire 50.

The connecting portion 25 is composed of a core connecting portion 25A and a barrel 25B. The core connecting portion 25A is a flat plate extending from a central part of one edge of the body 22 in a direction perpendicular to an extending direction of this edge and along plate surfaces of the body 22. The core connecting portion 25A is provided on a base side and is to be connected to a core 51 of the wire 50. The barrel 25B is provided on a leading end side and is to be crimped to an outer coating 52 of the wire 50.

A locking projection 23 projects at a position of an edge of the body 22 facing the connecting portion 25 and functions to position and retain the busbar 21 with respect to the insulating protector 30 (busbar holding portion 31) to be described later.

Semicircular positioning recesses 24 are formed in central parts of two edges of the body 22 facing each other on sides where the connecting portion 25 and the locking projection 23 are not provided. The positioning projections 13 of the unit cells 11 are to be fit to the positioning recesses 24.

A busbar-side attachment piece 26 (an example of a busbar-side attachment portion) is provided on one end (left upper side of FIG. 5) of the edge that has the connecting portion 25 and is to be connected to a detecting member-side attachment piece 44 of the detecting member 40 to be described later. The busbar-side attachment piece 26 extends parallel to the connecting portion 25, i.e. in the direction perpendicular to an extending direction of the edge part provided with the busbar-side attachment piece 26 and along the plate surfaces of the body 22.

The busbar 21 is formed by press-working a metal plate material such as copper, copper alloy, stainless steel (SUS) or aluminum into a predetermined shape.

(Temperature Detecting Member 40)

As shown in FIGS. 4 and 5, the temperature detecting member 40 includes a temperature detecting element 41 configured, for example, by a thermistor and a heat transfer plate 42 (an example of an attachment portion).

A PTC thermistor or an NTC thermistor can be the thermistor. However, another element that is capable of temperature detection can be selected as the temperature detecting element 41.

The heat transfer plate 42 is made of a metal plate material such as copper, copper alloy, stainless steel (SUS) or aluminum. The heat transfer plate 42 includes a rectangular placing portion 43 and a detecting member-side attachment piece 44 (an example of an attachment portion) extending from one end of an edge of the placing portion 43 in a direction perpendicular to an extending direction of this edge and along plate surfaces of the placing portion 43. Specifically, the entire heat transfer plate 42 is substantially L-shaped in a plan view. The detecting member-side attachment piece 44 has a width equal to the width of the busbar-side attachment piece 26 and is overlapped with and held in surface contact with the busbar-side attachment piece 26.

The temperature detecting element 41 is fixed to the upper surface of the placing portion 43 in advance by an insulating adhesive such as an epoxy resin.

A wire 45 is connected to the temperature detecting element 41. The wire 45 is pulled out in a direction along the plate surfaces of the placing portion 43 from a side surface of the temperature detecting element 41. The wire 45 is connected to an unillustrated external circuit and a signal from the temperature detecting element 41 is transmitted to the external circuit via this wire 45. The external circuit is, for example, arranged in an unillustrated battery ECU and the temperature of the busbar 21, i.e. the temperature of the electrode terminals 12 is detected based on a signal from the temperature detecting element 41.

(Insulating Protector 30)

Figure 2:
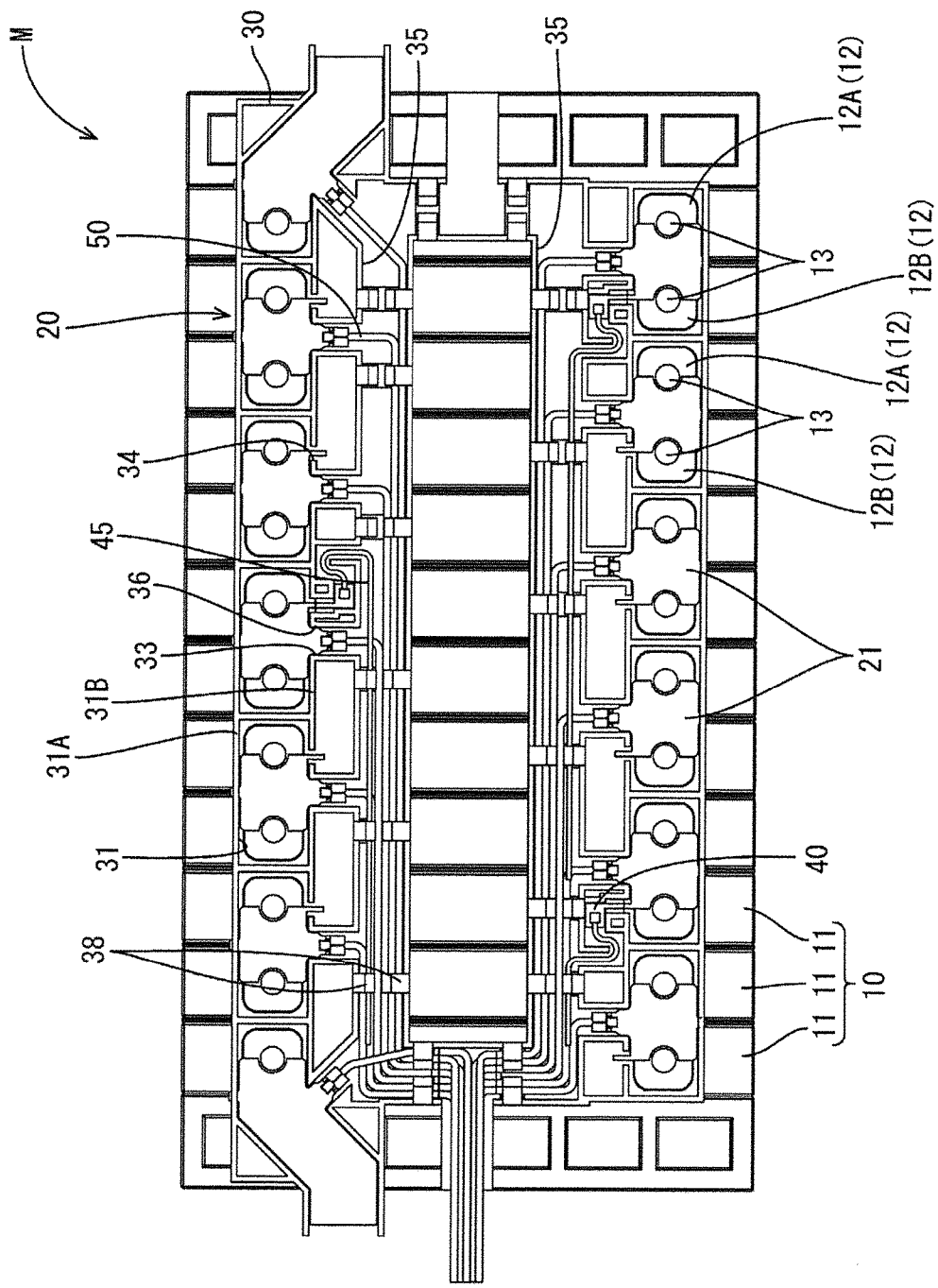
FIG. 2 is a plan view of the battery module.

As shown in FIGS. 1 and 2, the insulating protector 30 is long and narrow in an arrangement direction (lateral direction in FIG. 2) of the unit cells 11. A plurality of busbar holding portions 31 are provided side by side in two rows in the insulating protector 30. The busbar holding portions 31 open in the vertical direction and includes partition walls capable of partitioning the busbars 21 from outside and holding the busbars 21.

Two wire accommodation grooves 35 are provided between the two rows of the busbar holding portions 31 and accommodate the wires 50 connected to the busbars 21 and the wires 45 connected to the temperature detecting elements 41. Each wire accommodation groove 35 includes two groove walls 35A, 35B and a bottom 35C, and is provided along an arrangement direction of the busbar holding portions 31 (longitudinal direction of the insulating protector 30).

Each busbar holding portion 31 has a rectangular shape in a plan view and is dimensioned to enclose a pair of adjacent electrode terminals 12A, 12B. Each busbar holding portion 31 also functions as a protection wall for the two adjacent electrode terminals 12A, 12B.

A locking hole 32 is provided in a central bottom part in an extending direction (lateral direction of FIG. 2) of an outer side wall 31 of the partition wall of one busbar holding portion 31 located on an outer side of the insulating protector 30 (see FIG. 1). The locking hole 32 receives the locking projection 23 of the busbar 21 overlapped with the electrode terminals 12.

Figure 3:
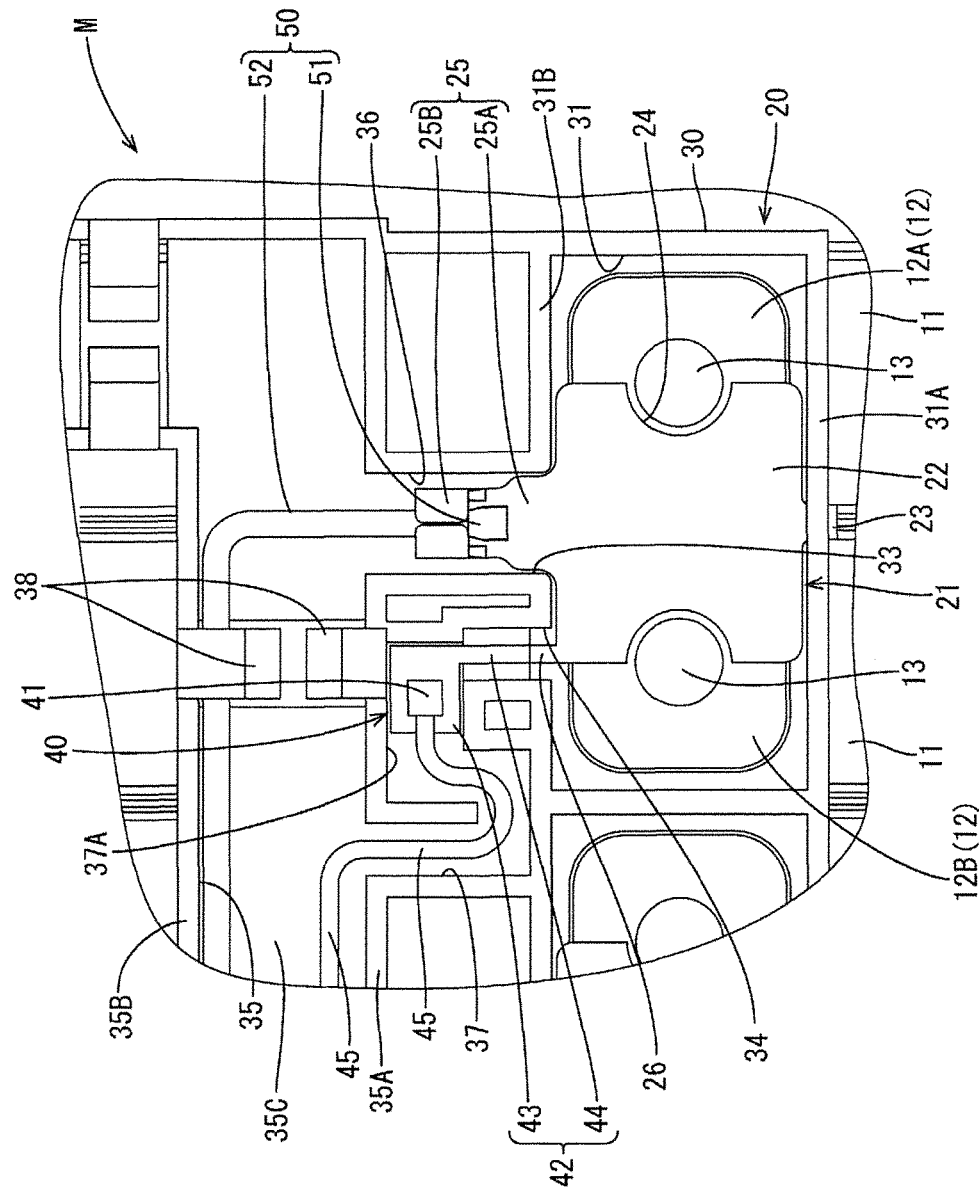
FIG. 3 is a partial enlarged plan view of the battery module.

A central part in an extending direction of an inner side wall 31B arranged to face the outer side wall 31A of the partition wall of one busbar holding portion 31 is cut vertically cut to form a first through portion 33 through which the connecting portion 25 of the busbar 21 is to be passed (see FIG. 3). The first through portion 33 enables a first communication groove 36 for accommodating the connecting portion 25 of the busbar 21 to communicate with the busbar holding portion 31 communicate.

The inner side wall 31B of one busbar holding portion 31 is cut vertically at a position near one end in the extending direction to form a second through portion 34 adjacent to the first through portion 33, and the busbar-side attachment piece 26 of the busbar 21 is passed through the second through portion 34.

A predetermined one of the plurality of busbar holding portions 31 communicates with a second communication groove 37 through the second through portion 34. As shown in FIG. 3, the second communication groove 37 accommodates the temperature detecting member 40 and a part of the wire 45 connected to the temperature detecting member 40 (temperature detecting element 41) and allows the wire 45 to be drawn out toward the side of the wire accommodation groove 35.

The second communication groove 37 extends from the second through portion 34 of the busbar holding portion 31 toward the inside of the insulating protector 30 to be perpendicular to the inner side wall 31B, meanders substantially in a Z shape and joins the wire accommodation groove 35 in a direction perpendicular to the extending direction of the wire accommodation groove 35. A part of the second communication groove 37 where the placing portion 43 of the temperature detecting member 40 is arranged defines a wide portion 37A that is wider than other parts. A groove width of this wide portion 37A is slightly larger than a width of the placing portion 43. The wire 45 connected to the temperature detecting member 40 (temperature detecting element 41) is arranged in a meandering manner in the insulating protector 30 along the second communication groove 37 and drawn out toward the wire accommodation groove 35.

A part of the groove wall 35A of the wire accommodation groove 35 on the side of the busbar holding portion 31 is cut and communicates with the second communication groove 37 so that the wire 45 connected to the temperature detecting member 40 (temperature detecting element 41) can be introduced into the wire accommodation groove 35 from the side of the busbar holding portion 31. Further, a part of the groove wall 35A facing the first through portion 33 is cut to enable the wire 50 connected to the connecting portion 25 of the busbar 21 to be introduced into the wire accommodation groove 35.

Further, restricting pieces 38 are provided on the upper end edges of the groove walls 35A, 35B of the wire accommodation groove 35 and project from one groove wall 35A, 35B toward the other groove wall 35B, 35A for restricting the protrusion of the wires 45, 50 from the wire accommodation groove 35.

The wires 45, 50 routed in the wire accommodation groove 35 are drawn out to the outside of the battery module M and connected to a control unit (not shown) such as an ECU.

(Assembling Method of Wiring Module 20)

In assembling the wiring module 20 of this embodiment, the busbars 21 connected to the wires 50 (cores 51) by ultrasonic welding are accommodated into the busbar holding portions 31 of the insulating protector 31. At this time, the locking projections 23 of the busbars 21 are fit into the locking holes 32 of the busbar holding portions 31, the connecting portions 25 are accommodated into the first communication grooves 36 and the wires 50 are routed in the wire accommodation groove 35. In a state where the busbars 21 are accommodated in the busbar holding portions 31, the busbar-side attachment pieces 26 are passed through the second through portions 34

Subsequently, the temperature detecting members 40 are accommodated into the second communication grooves 37 communicating with the predetermined busbar holding portions 31. At this time, the placing portions 43 of the temperature detecting members 40 are arranged in the wide portions 37A of the second communication grooves 37 and the detecting member-side attachment pieces 44 are overlapped with the busbar-side attachment pieces 26. Further, the wires 45 connected to the temperature detecting elements 41 are routed along the second communication grooves 37 and are introduced into and accommodated in the wire accommodation groove 35.

(Assembling Method with Unit Cell Group 10)

The of unit cells 11 are arranged such that adjacent electrode terminals 12A, 12B have different polarities, and the wiring module 20 in which the busbars 21 and the temperature detecting members 40 are arranged is mounted on a surface of the unit cell group 10 where the electrode terminals 12A, 12B are formed.

Then, the positioning projections 13 of the unit cells 11 are arranged in the positioning recesses 24 of the busbars 21 and the busbars 21 and the electrode terminals 12 are positioned.

Subsequently, laser welding is applied to parts, where the respective busbars 21 and the electrode terminals 12 overlap to electrically connect the busbars 21 and the electrode terminals 12. Laser welding also is applied to parts where the detecting member-side attachment pieces 44 and the busbar-side attachment pieces 26 overlap to thermally connect the temperature detecting members 40 and the busbars 21. As a result, heat generated in the unit cells 11 by charging or discharging is transferred from the electrode terminals 12 to the busbars 21 and from the busbars 21 to the temperature detecting members 40. In this way, the battery module M is completed.

(Functions, Effects of Embodiment)

According to this embodiment the temperature detecting member 40 is attached to the busbar 21 by laser welding, and it is not necessary to provide a fastening member for fixing the temperature detecting member 40 to the busbar 21. Therefore, the number of components can be reduced.

Further, laser welding of the busbar-side attachment piece 26 and the detecting member-side attachment piece 44 can be performed utilizing a laser welding facility. Thus, an attaching operation can be simplified when laser-welding the busbar 21 and the electrode terminals 12.

Figure 6:
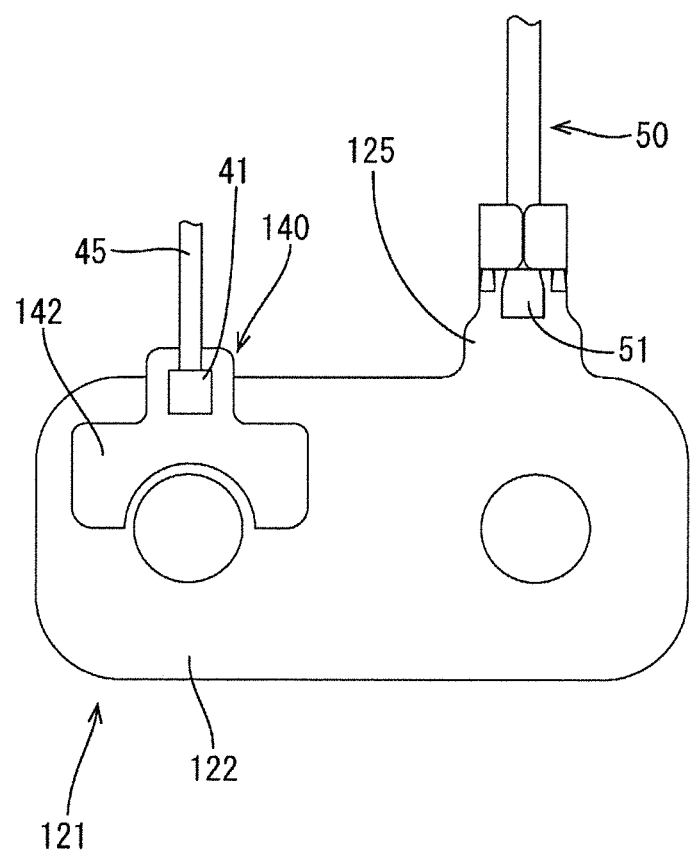
FIG. 6 is a plan view showing a state where a temperature detecting member of another embodiment is attached to a busbar.

The technique disclosed in this specification is not limited to the above described and illustrated embodiment. For example, the following embodiments are also included in the technical scope In the above embodiment, the busbar 21 is provided with the busbar-side attachment piece 26 and the temperature detecting member 40 is provided with the detecting member-side attachment piece 44. The busbar 21 and these attachment pieces are overlapped and thermally connected by laser welding. However, these attachment pieces 26, 44 are not always necessary. For example, laser welding may be applied with a heat transfer plate 142 of a temperature detecting member 140 directly overlapped with a body 122 of a busbar 121, as shown in FIG. 6.

In the above embodiment, the wiring module 20 in which the busbars 21 and the temperature detecting members 40 are arranged at predetermined positions is attached to the unit cell group 10 and the busbars 21 and the temperature detecting members 40 are laser-welded when the busbars 21 and the electrode terminals 12 are laser-welded. However, for example, the busbars 21 and the temperature detecting members 40 may be thermally connected in advance by laser welding and, thereafter, the busbars 21 and the temperature detecting members 40 may be accommodated collectively into the insulating protector 30 and attached to the unit cell group 10.

The configuration of the temperature detecting member 40 is not limited to that of the above embodiment and can be appropriately changed without departing from the technique disclosed in this specification. For example, as shown in FIG. 6, the shape of the heat transfer plate 142 (attachment portion) may be changed in accordance with the form of the busbar 121 to be attached.

The busbars 21 and the electrode terminals 12 are not limited to the shapes of the above embodiment. For example, as shown in FIG. 6, the body 122 of the busbar 121 may have a substantially rectangular shape to entirely cover adjacent electrode terminals 12 and a connecting portion 125 may be provided near an end of one edge of the body 122.

Although the connecting portion 25 of the busbar 21 and the core 51 of the wire 50 are connected by ultrasonic welding in the above embodiment, the connecting portion 25 and the core 51 may be connected such as by crimping.

LIST OF REFERENCE SIGNS

M: battery module
10: unit cell group
11: unit cell (power storage element)
12A, 12B: electrode terminal
20: wiring module
21: busbar
22: body
25: connecting portion
26: busbar-side attachment piece (busbar-side attachment portion)
30: insulating protector
31: busbar holding portion
36: wire accommodation groove
40: temperature detecting member
41: temperature detecting element
42: heat transfer plate (attachment portion)
43: placing portion
44: detecting member-side attachment piece (attachment portion)
45, 50: wire
51: core

The invention claimed is:

1. A structure for attaching a temperature detecting member to a busbar that electrically connects adjacent electrode terminals of power storage elements by laser welding by being overlapped with the electrode terminals of the power storage elements having positive and negative electrode terminals, comprising:
   positioning recesses provided in the busbar; and
   positioning projections provided on the electrode terminals and engaged in the positioning recesses provided in the busbar; wherein
   the temperature detecting member includes a plate-like attachment portion that is overlapped in an area of the busbar other than an area to be laser-welded to the electrode terminals and is attached to the busbar by laser welding.

2. The structure for attaching the temperature detecting member to the busbar of claim 1, wherein the busbar includes a body to be overlapped with the electrode terminals and a busbar-side attachment portion extending from the body, and the attachment portion of the temperature detecting member is overlapped with the busbar-side attachment portion.

3. A wiring module, comprising:
   a busbar and a temperature detecting member having the structure for attaching the temperature detecting member to the busbar of claim 2; and
   an insulating protector for holding the busbar and the temperature detecting member.

4. A method for manufacturing a wiring module to be attached to power storage elements, the power storage elements having electrode terminals, and the electrode terminals having positioning projections, the method comprising:
   providing a busbar with positioning recesses;
   overlapping the busbar with the electrode terminals of the power storage elements while engaging the positioning recesses with the positioning projections;
   laser-welding the busbar to adjacent ones of the electrode terminals of the power storage elements;
   overlapping a plate-like attachment portion of a temperature detecting member in an area of the busbar other than an area laser-welded to the electrode terminals; and
   laser-welding the attachment portion to the busbar.

* * * * *